United States Patent
Lau et al.

(10) Patent No.: US 9,723,118 B2
(45) Date of Patent: Aug. 1, 2017

(54) METHOD OF IDENTIFYING CONTACTS FOR INITIATING A COMMUNICATION USING SPEECH RECOGNITION

(71) Applicants: RESEARCH IN MOTION LIMITED, Waterloo (CA); QNX SOFTWARE SYSTEMS LIMITED, Kanata (CA)

(72) Inventors: Stephen Lau, Ottawa (CA); Darrin Kenneth John Fry, Kanata (CA); Jianqiang Shi, Nepean (CA)

(73) Assignees: BlackBerry Limited, Waterloo (CA); 2236008 Ontario Inc., Waterloo (CA)

( * ) Notice: Subject to any disclaimer, the term of this patent is extended or adjusted under 35 U.S.C. 154(b) by 222 days.

(21) Appl. No.: 13/706,643

(22) Filed: Dec. 6, 2012

(65) Prior Publication Data

US 2014/0163994 A1    Jun. 12, 2014

(51) Int. Cl.
| | | |
|---|---|---|
| H04M 1/27 | (2006.01) | |
| H04L 29/12 | (2006.01) | |
| H04M 1/2745 | (2006.01) | |

(52) U.S. Cl.
CPC ......... H04M 1/271 (2013.01); H04L 61/1594 (2013.01); H04M 1/274525 (2013.01)

(58) Field of Classification Search
CPC ...................................................... G06F 16/21
USPC ......................................................... 704/275
See application file for complete search history.

(56) References Cited

U.S. PATENT DOCUMENTS

| | | | |
|---|---|---|---|
| 6,466,654 B1 * | 10/2002 | Cooper et al. | 379/88.01 |
| 6,757,362 B1 * | 6/2004 | Cooper et al. | 379/88.01 |
| 7,415,100 B2 * | 8/2008 | Cooper et al. | 379/88.01 |
| 7,580,363 B2 | 8/2009 | Sorvari et al. | |
| 7,890,957 B2 * | 2/2011 | Campbell | 719/313 |
| 8,208,911 B2 * | 6/2012 | Abdel-Kader | 455/415 |
| 2003/0210770 A1 * | 11/2003 | Krejcarek | 379/88.17 |
| 2005/0076241 A1 * | 4/2005 | Appelman | 713/201 |

(Continued)

FOREIGN PATENT DOCUMENTS

| | | | | |
|---|---|---|---|---|
| CA | WO99/31856 | * | 6/1999 | H04M 1/00 |
| EP | 1246438 | | 10/2002 | |
| WO | 99/31856 | | 6/1999 | |

OTHER PUBLICATIONS

Extended European Search Report dated Jun. 21, 2013 for European Patent Application No. 12195962.1.

*Primary Examiner* — Michael N Opsasnick
(74) *Attorney, Agent, or Firm* — Ridout and Maybee LLP

(57) ABSTRACT

A method of initiating a communication using speech recognition on a mobile wireless communication device. Voice input is parsed using speech recognition to identify and extract a name and a communication type to be initiated from a plurality of potential communication types. A local address book is searched to identify all contact records having both a contact name including the name extracted from the voice input and a populated address field associated with the communication type extracted from the voice input. When only one contact record matches the extracted information, a communication is automatically initiated to the contact address from the populated address field of the contact record using an application associated with the communication type. When more than one contact record in the local address book matches the extracted information, a list of all of the matching contacts is output from which a communication can be initiated.

20 Claims, 8 Drawing Sheets

(56) References Cited

U.S. PATENT DOCUMENTS

| | | |
|---|---|---|
| 2006/0179114 A1* | 8/2006 | Deeds .......................... 709/206 |
| 2007/0060114 A1* | 3/2007 | Ramer et al. ................. 455/418 |
| 2008/0045184 A1* | 2/2008 | Randall et al. ............ 455/412.2 |
| 2008/0207271 A1 | 8/2008 | Krutik et al. |
| 2009/0018839 A1* | 1/2009 | Cooper et al. ................ 704/260 |
| 2010/0150321 A1 | 6/2010 | Harris et al. |
| 2011/0106889 A1 | 5/2011 | Scott et al. |
| 2011/0151850 A1* | 6/2011 | Haaparanta et al. ......... 455/415 |
| 2011/0212712 A1* | 9/2011 | Abdel-Kader ................ 455/415 |
| 2011/0288868 A1 | 11/2011 | Llyod |
| 2012/0022874 A1 | 1/2012 | Lloyd et al. |
| 2012/0209705 A1* | 8/2012 | Ramer et al. .............. 705/14.51 |
| 2012/0246245 A1 | 9/2012 | Nilsson |
| 2012/0317212 A1* | 12/2012 | Appelman .................... 709/206 |

* cited by examiner

METHOD OF IDENTIFYING CONTACTS FOR INITIATING A COMMUNICATION USING SPEECH RECOGNITION

TECHNICAL FIELD

Example embodiments relate to the field of voice-based communications with electronic devices.

BACKGROUND

Automatic speech recognition (ASR) is the translation of spoken words into text. Speech recognition applications include voice user interfaces such as voice dialing, call routing, appliance control, search, data entry, preparation of structured documents, and speech-to-text processing (e.g., word processors or emails).

In some conventional applications, when using ASR to contact a desired recipient, often multiple contacts with the same name will be returned. Some of those contacts may not have the relevant contact fields populated for the intended type of communication. In some instances, a selection of one of those contact names may result in an error message or prompt which indicates that the selected contact does not have that type of contact field for the given application.

For example, in some conventional systems, if the user wishes to send an e-mail using only the first name of the intended recipient, all users having that name may be presented to the user, regardless of whether they have an associated e-mail address.

Some other conventional systems use complicated weighting and disambiguation algorithms, to attempt to locate the best result using ASR. Such systems can be prone to false positives, and rely on weighted probabilities to, often but not necessarily always, identify the intended recipient.

Additional difficulties with some existing systems may be appreciated in view of the detailed description below.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION OF EXAMPLE EMBODIMENTS

Figure 1:
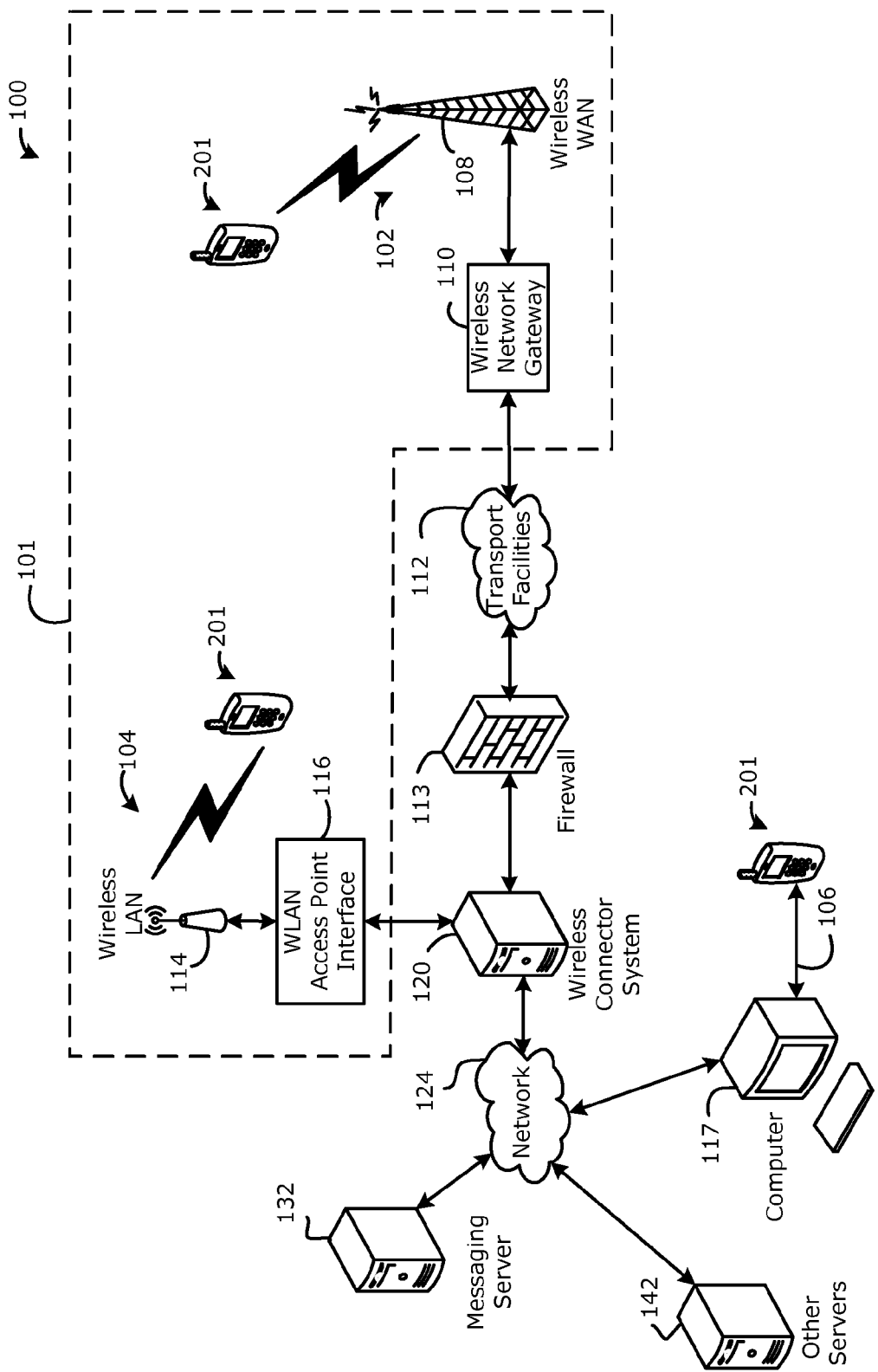
FIG. 1 illustrates a block diagram of a communications system to which embodiments may be applied.

In some example embodiments, there is provided a method which processes a voice input intending to initiate a communication, the voice input specifying a type of communication and at least part of a contact name. The method identifies or determines which contacts have the part of the contact name and which have a contact address associated with the type of communication, and outputs those contacts in a selectable list to the user.

In some example embodiments, the method accesses remote contact information from a remote server or application, in order to locate the desired contact for the user.

For example, to reduce the number of name matches the method is configured to remove matches that do not have a valid populated field for the type of contact specified. For example, if the user says "send Darrin an e-mail message" and there are ten people named Darrin but only one or two contact in the address book named Darrin who have an associated e-mail address, there is no reason to show the non e-mail contacts as the user will not be able to send them a message.

After retrieving a list of all possible contacts named Darrin, the method can further reduce the list by removing all possible contacts that do not have the relevant field, in this example the relevant field would be e-mail address.

In accordance with an example embodiment, there is provided a method on an electronic device having access to contact information for a number of contacts, the method including: receiving through an audio input interface a voice input for initiating a communication; extracting from the voice input a type of communication and at least part of a contact name; and outputting, to an output interface, a selectable list of all contacts from the contact information which have the part of the contact name and which have a contact address associated with the type of communication.

In accordance with another example embodiment, there is provided an electronic device having access to contact information for a number of contacts, including: a processor; a memory coupled to the processor; an input interface including an audio input interface; and an output interface. The memory includes instructions, which when executed by the processor, cause the processor to: receive through the audio input interface a voice input for initiating a communication, extract from the voice input a type of communication and at least part of a contact name, and output, to the output interface, a selectable list of all contacts from the contact information which have the part of the contact name and which have a contact address associated with the type of communication.

In accordance with yet another example embodiment, there is provided a non-transitory computer readable medium having instructions stored thereon executable by a processor on an electronic device having access to contact information for a number of contacts, the instructions including: instructions for receiving through an audio input interface a voice input for initiating a communication; instructions for extracting from the voice input a type of communication and at least part of a contact name; and instructions for outputting, to an output interface, a selectable list of all contacts from the contact information which have the part of the contact name and which have a contact address associated with the type of communication.

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) and optionally other servers 142. The other servers 142 may comprise a content server for providing content such as internet content or content from an organization's internal servers to the mobile communication devices 201 in the wireless network 101, an application server for implementing server-based applications such as instant messaging (IM) applications, or a web server for providing content accessible by a web browser.

For the purposes of the described example embodiments, any server within an enterprise network, such as a messaging server or any other server, will be referred to as an enterprise server. A service may include one or more servers or enterprise servers.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

Encryption keys used for communications or for encrypting data stored on the device can be protected via various means such as a password or hardware-based protections, such as those afforded by hardware-based key stored mechanisms.

The wireless network gateway 110 is adapted to send data packets received from the mobile device 201 over the WWAN 102 to the wireless connector system 120. The wireless connector system 120 then sends the data packets to the appropriate connection point such as the messaging server 132, or other servers 142. Conversely, the wireless connector system 120 sends data packets received, for example, from the messaging server 132, or other servers 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, or other servers 142.

The network 124 may comprise a private local area network, metropolitan area network, wide area network, the public internet or combinations thereof and may include virtual networks constructed using any of these, alone, or in combination.

A mobile device 201 may alternatively connect to the wireless connector system 120 using a computer 117, such as desktop or notebook computer, via the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth® special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the example embodiments.

Figure 2:
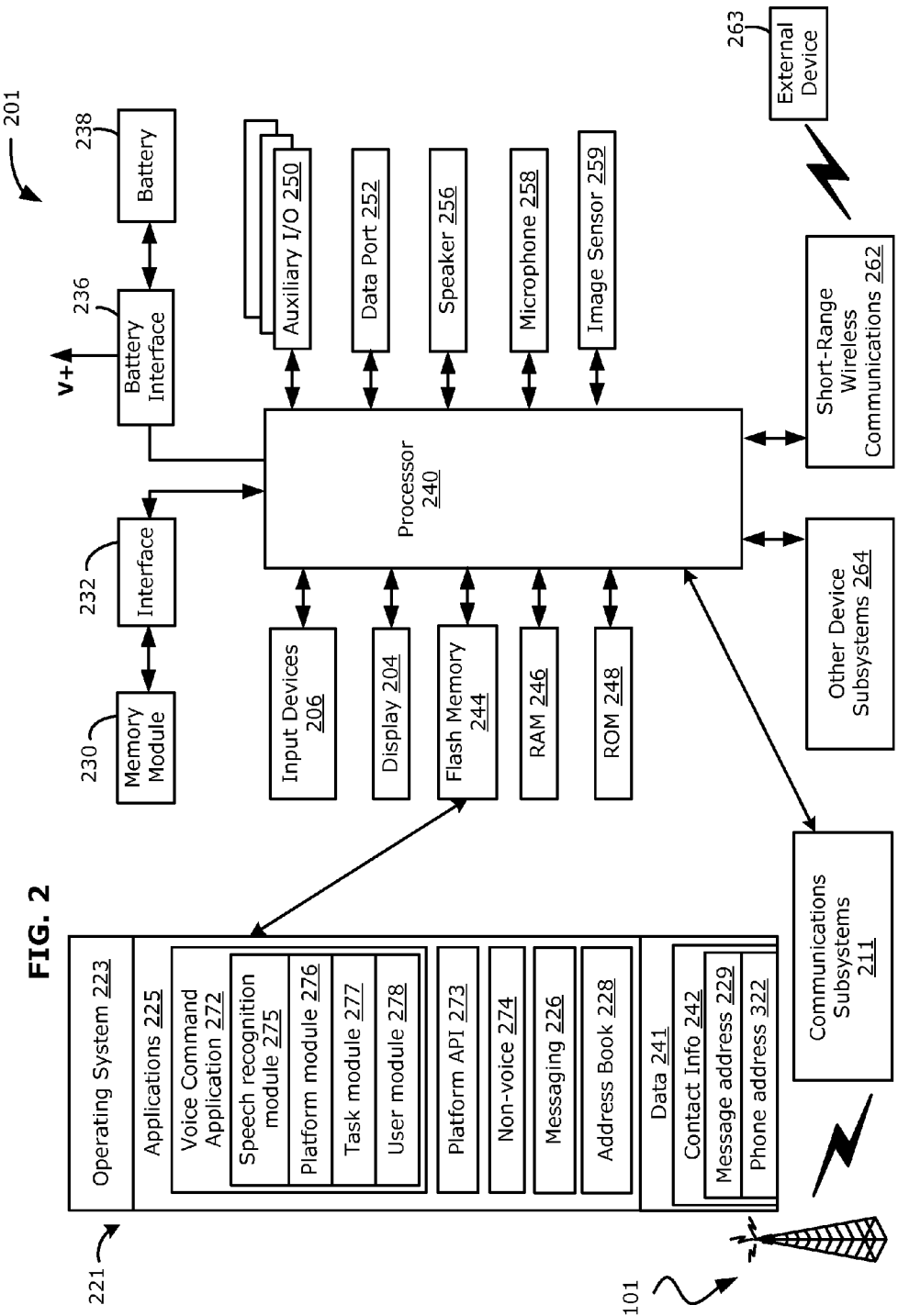
FIG. 2 illustrates a block diagram showing an example embodiment of a mobile device that can be used in the communications system of FIG. 1.

Reference is first made to FIG. 2 which shows in block diagram form a mobile device 201 in which example embodiments can be applied. The mobile device 201 is a two-way communication device having data and voice communication capabilities, and the capability to communicate with other computer systems, for example, via the Internet. Depending on the functionality provided by the mobile device 201, in various embodiments the mobile device 201 may be a smartphone, a mobile telephone or a PDA (personal digital assistant) or tablet enabled for wireless communication, or a computer system with a wireless modem, such as a computer system within a vehicle.

The mobile device 201 includes a case (not shown) housing the components of the device 201. The internal components of the mobile device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port speaker 256, microphone 258.

The mobile device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The mobile device 201 may communicate with any one of a plurality of fixed transceiver base stations 108 (FIG. 1) of the wireless network 101 within its geographic coverage area. The mobile device 201 may send and receive communication signals over the wireless network 101 after the required network registration or activation procedures have been completed.

The processor 240 operates under stored program control and executes software modules 221 stored in memory such as persistent memory, for example, in the flash memory 244. As illustrated in FIG. 2, the software modules 221 comprise operating system software 223, data 241, and software applications 225, which for example, may include a platform API 273, one or more non-voice applications 274 and a voice command application 272. The voice command application 272 may include speech recognition module 275, a platform module 276, a task module 277, and a user module 278. The software applications 225 may further include a web browser (not shown), a file manager application (not shown), one or more messaging applications 226 such as a text or instant messaging application, and an email messaging application, and an address book application 228. Such applications 225 may or may not already be voice-enabled. In some example embodiments, the functions performed by each of the applications may each be realized as a plurality of independent elements, and any one or more of these elements may be implemented as parts of other software applications 225. The data 241 may include at least messaging address information 229 and telephone address information 322. In some example embodiments, one or more applications 225 are configured to receive data, such as files, documents or other information, from a server, such as a messaging server 132 (FIG. 1), or another server 142 (FIG. 1). Non-limiting examples of data received from a server may include email attachments, files transferred via file transfer protocol (FTP) or any other protocol, documents or files downloaded from a web page via a web browser, or files sent via a text or instant messaging application.

In some examples, the software applications 225 may be implemented using a number of services which define the communication protocols used to communicate between an external server 142 and an application on the communication device. Some applications may only connect to a single type of server using the same communication protocol settings and will therefore only operate using a single service, while other applications may connect to a variety of servers using different communication protocols and will require multiple services. For example, a banking application on a communication device may only require a single service defining the communication protocol for securely communicating with the bank's online banking server, while a web browser may require many different services such as services for general web page browsing, for secure web page browsing, for streaming video, for accessing corporate web email, for accessing social media applications or websites, or for accessing online public email services.

The software modules 221 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

In some embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 includes a removable memory card 230 (typically comprising flash memory) and a memory card interface 232. The mobile device 201 can store data on the removable memory card 230, in an erasable persistent memory, which in one example embodiment is the flash memory 244, or on both a removable memory card and in an erasable persistent memory.

In some embodiments, the mobile device 201 is provided with a service routing application programming interface (API) which provides an application with the ability to route traffic through a serial data (i.e., USB) or Bluetooth® connection to the host computer system using standard connectivity protocols. When a user connects their mobile device 201 to the host computer system via a USB cable or Bluetooth® connection, traffic that was destined for the wireless network 101 is automatically routed to the mobile device 201 using the USB cable or Bluetooth® connection. Similarly, any traffic destined for the wireless network 101 is automatically sent over the USB cable Bluetooth® connection to the host computer system for processing.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices. In another example, the subsystem 262 may communicate with an external device 263 having a microphone and a speaker (not shown), to aid in the hands-free operation of the mobile device 201.

The mobile device 201 also may include image sensor 259 configured to generate digital image data. The image sensor 259 may include a conventional optical sensor for capturing digitized image data, or may be some other digital imaging device. The image sensor 259 operates by capturing visual data from the environment using photosensitive electronic elements and transmitting or storing this data as digital image data using other components of the mobile device 201. The image sensor 259 may be, for example, a camera or a charge-coupled device (CCD).

A predetermined set of applications that control basic device operations, including data and possibly voice communication applications will normally be installed on the mobile device 201 during or after manufacture. Additional applications and/or upgrades to the operating system 223 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information. Similarly, audio signal input and audio signal output may be accomplished through an audio input interface and an audio output interface, respectively. The audio input interface may be the microphone 258, but may also be the short-range communication subsystem 262 which may receive an audio input from the external device 263. Similarly, the audio output interface may be the speaker 256, but may also be the short-range communication subsystem 262 which may communicate an audio output to the external device 263.

Referring again to FIG. 2, the software applications 225 of the mobile device 201 can include a platform API 273 of a platform class that is configured to permit applications, such as voice-enabled applications, to register with the platform API 273. As well, the platform API 273 is configured to receive events and pertinent information from non-voice applications 274 which becomes voice-enabled through operation the voice command application 272. These may include applications that are native or resident on the mobile device 201, and also may include applications developed by third party developers or external applications. Third party applications may include applications downloaded to the mobile device 201 through an external network. The platform API 273 is further configured to permit communication between the registered voice-enabled applications, including the voice command application 272, and the non-voice applications 274.

The voice command application 272 configures the processor to implement a speech recognition module 275, a platform module 276, a task module 277 and a user module 278. The speech recognition module 275 is configured to receive audio data gathered by the microphone 258 and, where this audio data comprises a voice input, the module may translate the voice input into text corresponding to the content of the voice input. The speech recognition module 275 may perform this translation according to any of a number of conventional speech recognition algorithms. The platform module 276 is configured to initiate the registration of the voice command application 272 with the platform API 273, enabling the voice command application 272 to receive information from the platform class regarding both voice-enabled applications and non-voice applications 274. The user module 278 is configured to produce a voice prompt to the user and to issue the voice prompt to the user via the speaker 256.

The platform module 276 of the voice command application 272 is configured to register the voice command application 272 with the platform API 273. Consequently, the voice command application 272 is identified as a registered "listener" of the platform API 273, and this enables the voice command application 272 to receive from the platform API 273 events and additional information regarding voice-enabled applications and the non-voice application 274.

The speech recognition module 275 of the voice command application 272 recognizes a voice input and receives a voice input via the microphone 258 of the mobile device 201. The activation of the voice command application 272 triggers the microphone 258 to be activated and monitoring for a voice input from a user. As well, the microphone 258 may be activated by other triggers to monitor for a voice input. Other embodiments may enable the microphone 258 to be "always on", etc.

The speech recognition module 275 of the voice command application 272 extracts from the voice input one or more elements. The speech recognition module 275 parses the voice input into one or more discrete elements that may define a voice command or a particular input for one of the user interface objects. The speech recognition module 275 may further translate the voice input received by the microphone 258 into text or another form intelligible to the mobile device 201, according to any of a number of conventional speech recognition algorithms as understood in the art. This type of disambiguation will not be described in detail herein, and for some example embodiments it is presumed that the exact term being specified from the voice input is correctly identified.

Referring again to FIG. 2, the address book application 228 provides a user interface for managing contact information 242. The address book application 228 is configured to allow users to view, add, delete, and/or modify contact information 242 associated with one or more contacts. The address book application 228 and the email messaging application 226 may, in various embodiments, be: integrated with and/or provided by the operating system 223; stand-alone applications 225; or integrated into a single messaging application which provides the functionality of both the messaging application 226 and the address book application 228.

The mobile communication device 201 stores data 241 in an erasable persistent memory, which in one example embodiment is the flash memory 244. The data 241 includes service data and user application data. The service data comprises information required by the mobile communication device 201 to establish and maintain communication with the wireless network 101. The user application data may include such as email messages (not shown), calendar and schedule information (not shown), notepad documents (not shown) and image files (not shown).

The user application data stored in the memory 244 also includes contact information 242 associated with a plurality of contacts. The contact information 242 may be for individuals and/or businesses, such as persons or businesses associated with one or more users of the mobile communication device 201. The contacts may also be categorized according to these individual and businesses categories. Individuals or businesses may also be saved as part of a group. The contact information 242 includes one or more contact addresses comprising messaging addresses 229. Each messaging address 229 specifies an address, such as an email address or a telephone number, which may be used by the contact for receiving electronic messages. The contact information 242 may be stored in a contact information database (sometimes referred to as an address book database or merely address book, contact list or contacts). Each contact in the contact information 242 may have a contact record in the contact information database which is accessible by the address book application 228. In some embodiments, the contact information 242 may be stored in a remote contact information database in addition to, or instead of, the memory 244. The remote contact information database is typically stored and managed by the messaging server 132, but could be stored and managed by another network component such as the wireless connector system 120. Some or all of the contact information 242 particular to the user could be synchronized between the local and remote contact information databases, depending on the embodiment. In addition, the user application data including contact information 242 may be synchronized with a user's host computer 117 in whole or in part in some embodiments.

It will be appreciated that, in some embodiments, the contact information 242 may include various categories or types of messaging addresses 229. For example, the messaging address 229 may be categorized as an email address, a telephone number associated with SMS messaging, an instant messaging address, or a unique identifier such as a personal identification number (PIN) which is associated with a specific mobile communication device 201 or user.

A messaging address 229 is an address for use in sending an electronic message of a given type. The messaging addresses 229 could be, but not limited to, a mobile telephone number for a mobile telephone capable of receiving SMS and/or MMS messages, an email address, an instant messaging (IM) identifier or address for an IM network, a user or device identifier such as a PIN for sending device-to-device messages (also referred to as peer-to-peer messages or PIN messages), an identifier within a private or proprietary communication system or network such as Facebook™, MySpace™ or Blackberry Groups™, or a SIP URI (session initiation protocol uniform resource identifier) for a Voice over Internet Protocol (VoIP) network. Contact identifiers could include predetermined types of identifying information which are not messaging addresses 229 including, but not limited to, identifying information for a Blog, Really Simple Syndication (RSS) feed identifying information, or a landline telephone number for a telephone on a public switched telephone network (PSTN).

Figure 3:
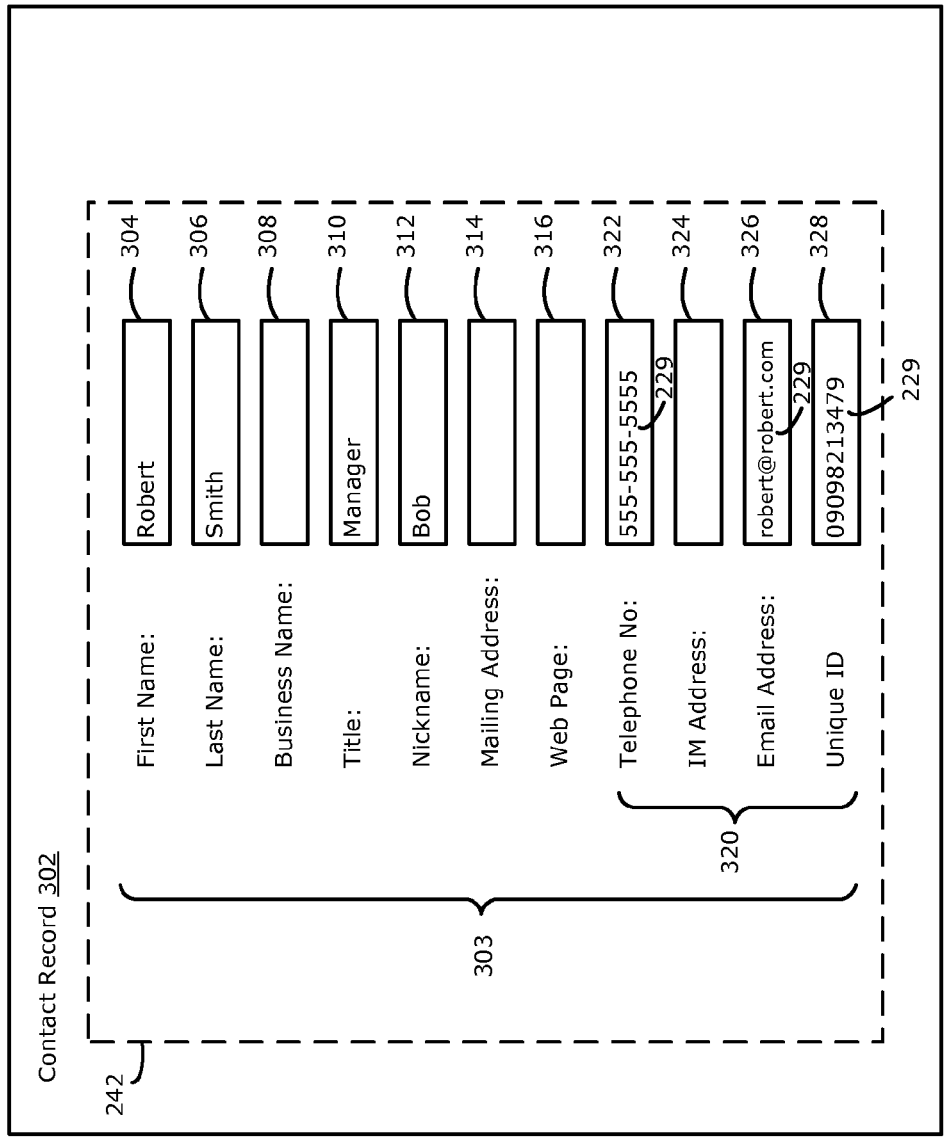
FIG. 3 illustrates a block diagram showing an example contact record with which example embodiments can be applied.

Referring now to FIG. 3, an example contact record 302 with which example embodiments can be applied will now be described. The contact record 302 shown in FIG. 3 illustrates the data structure of a contact record 302 rather than a user interface representation of the contact record 302. The GUI of a mobile communication device 201 may display a contact record 302 differently from that shown in FIG. 3, and may display more or less than the illustrated fields.

The contact record 302 includes a plurality of fields 303, including a first name field 304 which may be used for storing a contact's given name; a last name field 306 which may be used for storing a contact's surname; a business name field 308, which may be used to store the name of a company associated with the contact; a title field 310, which may be used to store the contact's job title; a nickname field 312, which may be used to store a nickname for the contact, such as an abbreviated form of the contact's given name; a mailing address field 314, which may be used to store a postal address associated with the contact; a web page field 316, which may be used to store the address of a web page associated with the contact; and a telephone number field 322, which may be used to store a telephone number.

The contact record 302 also includes one or more messaging address fields 320 which may be used to store one or more messaging addresses 229 which may be used to send an electronic message to the contact. For example, the messaging address field 320 may include one or more of the telephone number field 322, wherein the telephone number is associated with the contact and through which the contact may receive an SMS text message or MMS message; an instant messaging field 324, which may be used to store an instant messaging address associated with the contact; an email address field 326 which may be used to store an email address associated with the contact; and/or a unique identifier field 328 which may be used to store a unique identifier for sending device-to-device messages (also referred to as peer-to-peer messages or PIN messages). The unique identifier is different from the telephone number of the mobile communication device 201 and typically has a proprietary addressing format which may vary depending on the embodiment.

As will be appreciated to persons skilled in the art, device-to-device messages require software support on the mobile communication device 201. Accordingly, not all mobile communication devices 201 have the software required for message addressing using non-telephonic unique identifiers. Thus, it is possible that at least some of a user's contacts do not have a unique identifier. In such cases, device-to-device messages cannot be sent to such contacts and the unique identifier field 328 of the corresponding contact record 302 will be empty and possibly hidden depending on the GUI settings of the device 201.

The unique identifier stored in the unique identifier field 328 uniquely identifies a mobile communication device 201. The unique identifier may be, but is not limited to, a personal identification number (PIN) which is associated with a communication device associated with a contact, the contact, or both. The PIN may be numeric or alphanumeric. In some embodiments, the PIN is assigned to the contact's mobile communication device during its manufacturing. The PIN functions as an address for communicating with the contact's mobile communication device. That is, messages sent to a PIN will be received at the contact's mobile communication device associated with that PIN. The PINs of the mobile communication devices 201 are not published as may occur with telephone numbers. Typically, a PIN must be shared between users. Accordingly, contacts having a mobile communication device 201 which supports PIN addressing but have not shared their PINS will have a corresponding contact record 302 with an empty unique identifier field 328 which may be hidden depending on the GUI settings of the device 201.

Device-to-device messages are sent using a carrier's wireless network infrastructure without interacting with the wireless connector system 120 as with email messages and other electronic messages. Depending on the architecture, if the carrier's wireless network infrastructure does not support PIN addressing a third party relay service which supports PIN addressing may be required. The relay service provides routing services and stores routing information required to route device-to-device messages from a sending device to one or more receiving device(s) using the carrier's wireless network infrastructure. The routing information comprises address mappings of device PINs (or other unique identifiers) to another form of device address supported by the carrier's wireless network infrastructure including, but not limited to, IP addresses of the mobile communication devices.

As will be appreciated by persons skilled in the art, device-to-device messages and unique identifiers associated with recipient electronic devices used for addressing PIN messages are typically stored on the mobile communication device 201 in the personal address book database and not stored in the global address book database of the wireless connector system 120 or synchronized with a user's host computer 117. Accordingly, PIN-based filtering is typically only possible on a supported mobile communication device 201. In some embodiments, PINs may be stored by the messaging server 132 for the supported mobile communication devices 201 but not stored in the global address book database of the wireless connector system 120 or synchronized with a user's host computer 117. However, it is possible that in other embodiments PINs are stored in the global address book database of the wireless connector system 120 and synchronized with a user's host computer 117.

It will be appreciated that the contact record 302 may include more or less information than that described above with reference to FIG. 3. In some cases, some types of the contact information 242 specified above may contain multiple entries. For example, a contact may have more than one email address. It will also be appreciated that, each field of the contact record 302 may not be populated for all contacts. That is, some of the fields in the contact record 302 may be left intentionally blank for some contacts. For example, in the example contact record 302 illustrated in FIG. 3, the business name field 308, the mailing address field 314, the web page field 316 and instant messaging address field 324 have not been populated.

The contact records 302 in the contact information database may be indexed using one or more of the fields 303 of the contact record 302. For example, in some embodiments, the contact records 302 are indexed based on the contents of the first name field 304. In other embodiments, the contact records 302 are indexed based on the last name field 306.

Figure 4:
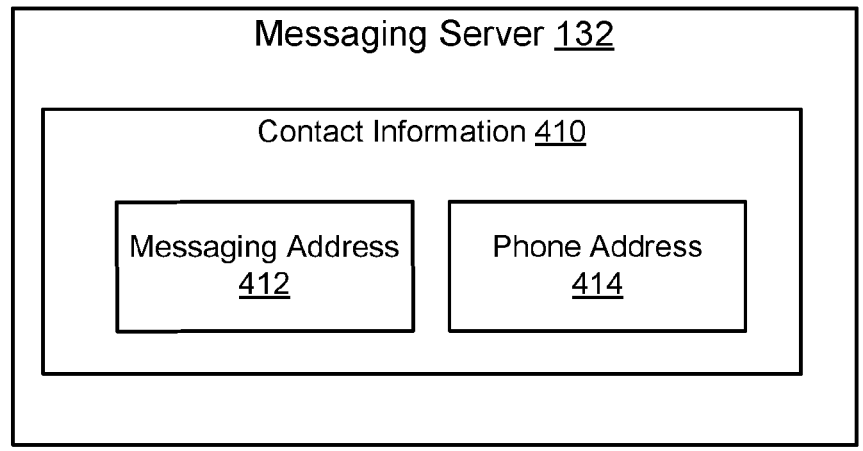
FIG. 4 illustrates a detailed block diagram of a messaging server to which example embodiments can be applied.
Figure 5:
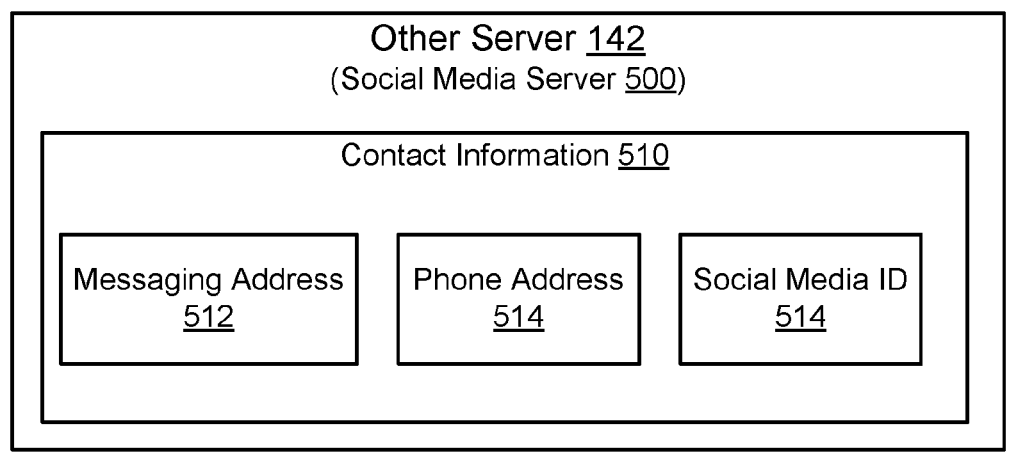
FIG. 5 illustrates a detailed block diagram of a social media server to which example embodiments can be applied.

Reference is now made to FIGS. 4 and 5, which illustrate remotely stored contact information which is accessible by the mobile device 201. In example embodiments, the mobile device 201 can have pre-stored key information, service records, login, password, and/or other information in order to readily access the messaging server 132 or the other servers 142.

Referring now to FIG. 4, remote contact information 410 of the messaging server 132 can include some or all of the contacts associated with an enterprise or a business. Such contacts can include personnel, employees, vendors, customers, etc. For example, such enterprise remote contact information 410 may be updated as personnel are added, removed, or modified (e.g. transfer or name change). For this reason, for some practical purposes, in some example embodiments the remote contact information 410 for the entirety of the enterprise may not be synchronized with the mobile device 201. Rather, such enterprise remote contact information 410 may be pulled or retrieved on an as-needed basis. As shown in FIG. 4, the remote contact information 410 can include at least messaging addresses 412 and/or telephone addresses 414. In some example embodiments, the telephone addresses 414 may contain information specific to the enterprise, such as a field for telephone extensions or internal dialing (without specifically requiring the associated telephone number). Some contact names of the contact information 410 may not have all of the possible contact address fields (e.g. instant messaging address, personal e-mail address and/or home phone number). In some example embodiments, some of the address fields may be unpopulated. In some example embodiments, some of the address fields may be populated but only accessible by some but not all users depending on their security or administrative settings, and be blocked to other users of the enterprise.

Referring now to FIG. 5, in an example embodiments, the other server 142 includes a social media server 500 which stores remote contact information 510. The social media server 500 is for providing social media applications such as Facebook™, LinkedIn™, MySpace™, and Twitter™. A difficulty with some social media applications is that a user's network of contacts is constantly changing and updated, wherein real-time synchronization may be impractical or undesired. For example, too many contacts may overcrowd a user's local address book. Another difficulty is that some social media applications may not be designed for voice interaction.

In some example embodiments, only the contacts associated within a user's social network will be considered to be accessible by the mobile device 201, such as the user's "friend's list" or "connections list". As shown in FIG. 5, the remote contact information 510 can include at least messaging addresses 512, telephone addresses 514, and/or social media identifiers 516. Some contact names of the contact information 510 may not have all of the possible contact address fields populated, or may be populated but not be accessible by the mobile device 201 depending on the particular contact's privacy settings. The remote contact information 510 may or may not be synchronized with the mobile device 201, depending on the particular user settings or the installation of add-on applications. If not synchronized, the remote contact information 510 may be pulled or retrieved on an as-needed basis.

The social media identifier 516 is typically specific to the social media application or social media server 500. A contact address field corresponding to the social media identifier 516 may also be stored in the contact record 302 (FIG. 3) of the mobile device 201. Non-limiting example identifiers or handles include Facebook™, LinkedIn™, MySpace™, and Twitter™. In some social media applications, the social media identifier 516 may be presented to the user as merely the contact first name and the contact last name, but there may be an internal identifier which is unique to the particular contact. Further, the social media identifier 516 can itself be used as a contact address to communicate with the desired contact, for example though the social media application or social media server 500. By way of example only, if a user wishes to perform a "poke" or "wall" writing to a specified Facebook contact, that is typically performed through the Facebook server 500. Such communications may reside in the server 500 until pulled by the recipient, or may be automatically copied to the recipient from the server 500, depending on the recipient's social media settings. The particular communication may be designated as "public" (for all in the recipient's social media network to see) or "private", as understood in the art. In another example, a Facebook profile may also contain an e-mail address for a specified Facebook user. The e-mail address can be used to contact the recipient either through the social media server 500, or through conventional e-mail via the messaging server 132 (FIG. 1), which is independent of the social media server 500.

Example method will now be described, with reference to FIGS. 6 to 9. Generally, in example embodiments, there is provided a method which processes a voice input intending to initiate a communication, the voice input specifying a type of communication and at least part of a contact name. The method identifies or determines which contacts have the part of the contact name and which have a contact address associated with the type of communication, and outputs those contacts in a selectable list to the user.

Figure 6:
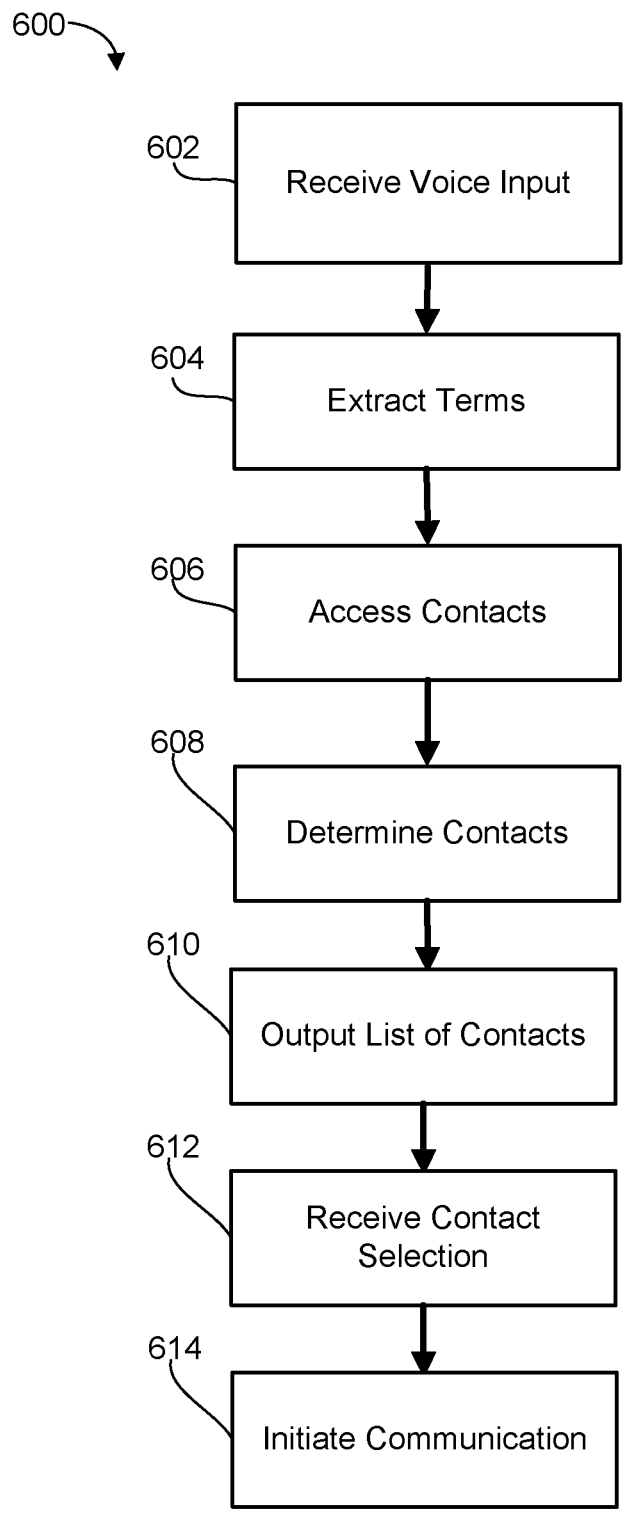
FIG. 6 shows, in flowchart form, an example method for identifying contacts for a communication, in accordance with an example embodiment.

Reference is now made to FIG. 6, which shows a method 600 of identifying contacts for initiating a communication on the mobile device 201. At event 602, the mobile device 201 receives through the audio input interface a voice input for initiating a communication. At event 604, the mobile device 201 extracts from the voice input a type of communication and at least part of a contact name. Referring briefly to FIG. 3, the part of the contact name can be, for example some or all of the first name 302, last name 306, business name 308, or nickname 312, etc. Depending on the type of desired communication, the voice input may also include the content of the communication, such as a message body. This and other information may be extracted from the voice input, as applicable.

At event 606, the mobile device 201 accesses contact information, such as from the address book 228 stored in memory 244 (FIG. 2). At event 608, the mobile device 201 determines which contacts have the part of the contact name and which have a contact address associated with the type of communication. At event 610, the mobile device 201 outputs, to an output interface, a selectable list of all of the determined contacts. If no contacts are located which satisfy these criteria, then in response the output to the interface may be, for example, a blank list having no entries, an error message, or a prompt for further input.

For example, the list of contacts may be output to the display screen 204, which can include a touchscreen. In another example, the list of contacts may be output to the speaker 256. For example, contact names having the extracted part of the contact name which have an unpopulated, blocked, or inaccessible address field of the type of communication would not be included in the list. The list of contacts may be output, in some example embodiments, in alphabetic order.

At event 612, the mobile device 201 receives selection of one of the contacts on the list through an input interface, such as through an input device, the touchscreen, or the microphone 258. In some example embodiments, selection of one of the contacts may require further input selection of a contact address through the input interface, for example if a desired recipient has two contact addresses of the same type of communication, such as two work e-mail addresses, etc. At event 614, the mobile device 201 initiates a communication to the contact address of the selected contact using an application corresponding to the type of communication. For example, if the contact address is a messaging address 229, the mobile device 201 uses a suitable application such as the messaging application 226. For example, if the contact address is a telephone address 322, the mobile device 201 uses a suitable telephone or audio conferencing application. The mobile device 201 may also populate the communication with additional content such as a message body, depending on the particular contents of the voice input.

For example, if the voice input of a user says "PIN Darrin I am running late", and there are ten people named Darrin but only one or two contact in the address book named Darrin who have an associated PIN address, there is no reason to show the non PIN contacts as the user will not be able to send them a message. After retrieving a list of all possible contacts named Darrin, the method of FIG. 6 can further reduce the list by removing all possible contacts that do not have the relevant contact address field, in this example the relevant field would be PIN address. A PIN message would then be generated with the message body of "I am running late".

In another example, if the voice input of a user says say "phone Jason" and there are four persons named "Jason" in the address book but only one or two have a phone number field which is populated, then there is no reason to show the non phone number contacts as the user will not be able to call them. After retrieving a list of all possible contacts named Jason, the method of FIG. 6 can further reduce the list by removing all possible contacts that do not have the relevant contact address field, in this example the relevant field would be the phone number.

Referring again to event 610, in an example embodiment, if there is only one contact in the list of contacts, the mobile device 201 may be configured to automatically initiate a communication to that contact using an application corresponding the type of communication. An output to the output interface may be used to notify the user that the mobile device is automatically performing the communication to that contact, and the user may be given a predetermined number of seconds to cancel such a communication.

Figure 7:
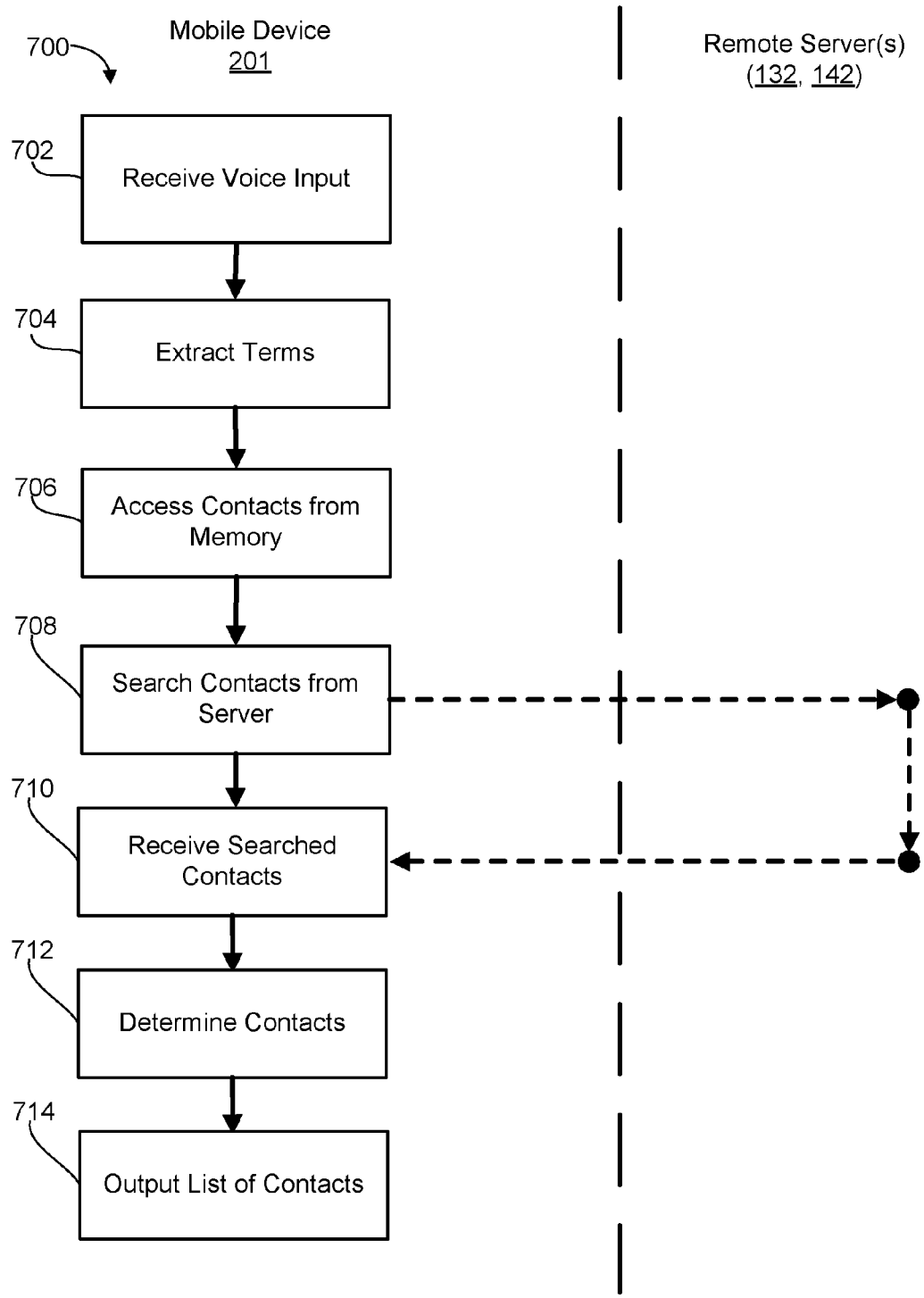
FIG. 7 shows another example method for identifying contacts for a communication, using one or more remote servers, in accordance with an example embodiment.

Reference is now made to FIG. 7, which shows another example method 700 of identifying contacts for initiating a communication on the mobile device 201, in accordance with another example embodiment. Generally, in the example embodiment shown in FIG. 7, both local and remote contact information are specifically accessed by the mobile device 201. The mobile device 201 is in communication with one or more remote servers, for example messaging server 132 and/or other servers 142 such as social media server 500. At event 702, the mobile device 201 receives through the audio input interface a voice input for initiating a communication. At event 704, the mobile device 201 extracts from the voice input a type of communication and at least part of a contact name. At event 706, the mobile device 201 accesses the contact information from the address book 228 stored in memory 244.

At event 708, the mobile device 201 retrieves any accessible contact information from the remote server(s), by using the extracted part of the contact name as a search term at the remote server(s) 132, 142. At event 710, the mobile device 201 receives the search results. The mobile device 201 may store or cache the received contact information. In other example embodiments, the mobile device 201 may store or cache the received contact name(s) along with only the associated contact address of the type of communication.

At event 712, the mobile device 201 determines which of the accessed contacts (both locally and remotely) have the part of the contact name and which have a contact address associated with the type of communication. At event 714, the mobile device 201 outputs, to an output interface, a selectable list of all of the determined contacts. As described above in greater detail with respect to FIG. 6, the mobile device 201 may then, upon selection of one of the contacts on the list through an input interface, initiate a communication to the contact address of the selected contact using an application corresponding to the type of communication. Depending on the particular type of contact address, the communication may be initiated through the messaging server 132 or the social media server 500.

Referring again to event 714, in some example embodiments, the selectable list of contacts is a single list of contacts which is an aggregate of all of the determined contacts, regardless of the source. In some example embodiments, the single list may have not have any identifier of the source of each contact being local or remote. For example, such information may not be included to avoid crowding a smaller display screen or unnecessarily lengthening an audio output.

Figure 8:
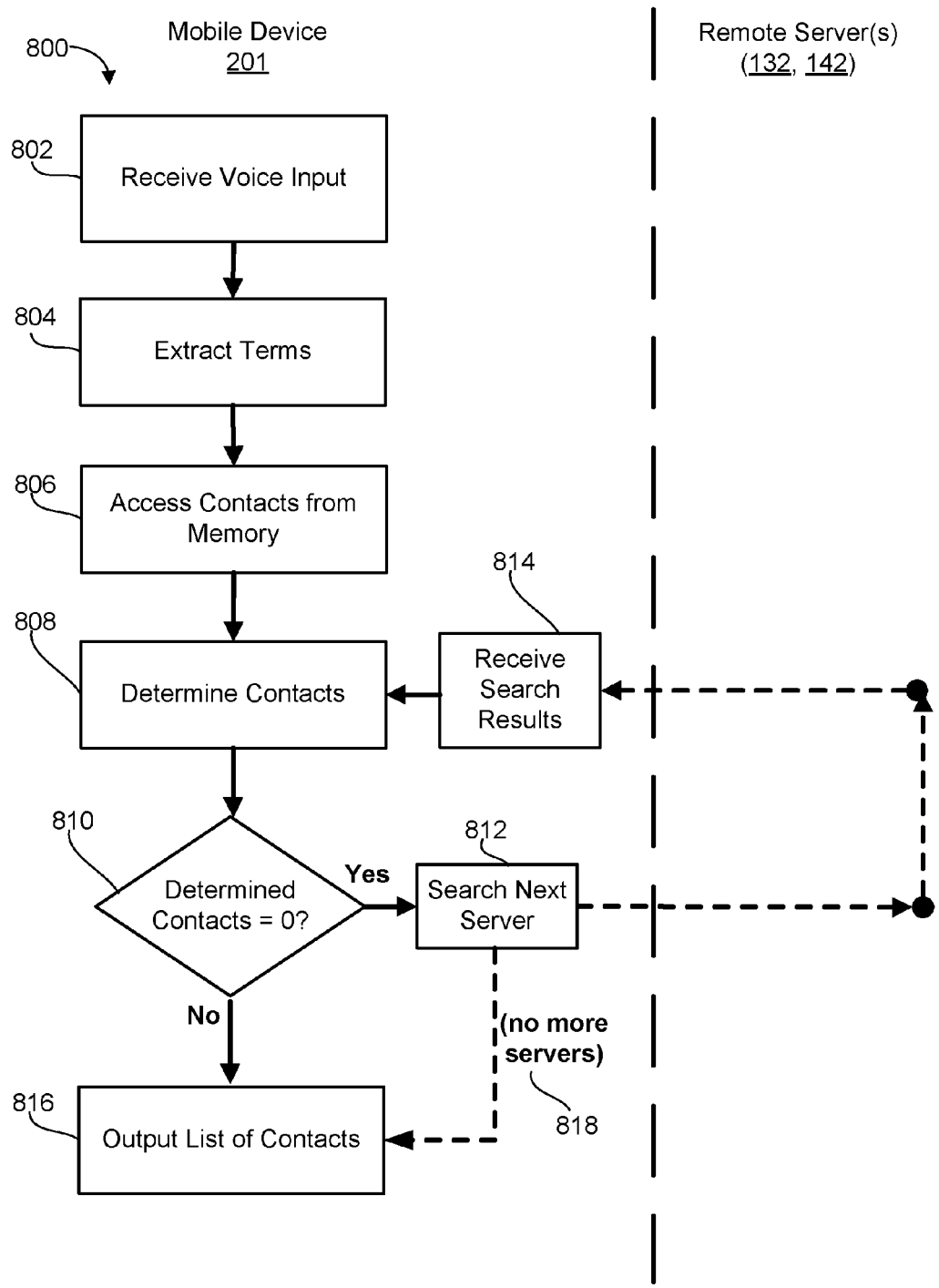
FIG. 8 shows another example method for identifying contacts for a communication, using one or more remote servers, in accordance with another example embodiment.

Reference is now made to FIG. 8, which shows another example method 800 of identifying contacts for initiating a communication on the mobile device 201, in accordance with another example embodiment. Generally, in the example embodiment shown in FIG. 8, contacts stored in the local memory 244 are first reviewed, and if no relevant contacts are found in the memory 244, then remote contact information are searched by the mobile device 201 to find the relevant contacts. The mobile device 201 is in communication with one or more remote servers, for example messaging server 132 and/or other servers 142 such as social media server 500. At event 802, the mobile device 201 receives through the audio input interface a voice input for initiating a communication. At event 804, the mobile device 201 extracts from the voice input a type of communication and at least part of a contact name. At event 806, the mobile device 201 accesses the contact information from the address book 228 stored in memory 244. At event 808, the mobile device 201 determines which of the locally accessed contacts have the part of the contact name and which have a contact address associated with the type of communication.

At event 810, the mobile device 201 determines whether no relevant contacts were found (e.g. determined contacts=0 or null). If so, at event 812 the mobile device 201 contacts one or more of the remote server(s). For example, the order of remote server(s) being accessed can be on a priority list or priority order. For example, the mobile device 201 may first search the contacts from the messaging server 132, which may be the next possible source of identifying the desired contact. However, subsequently if no relevant searches are found from the messaging server 132, then the mobile device 201 may search one or more other servers 142, such as one or more social media servers 500. Continuing such an example, the mobile device 201 searches for any accessible contact information from the messaging server 132. At event 814, the mobile device 201 receives the search results from the messaging server 132. The mobile device 201 may store or cache the received contact information. In other example embodiments, the mobile device 201 may store or cache the received contact name(s) along with only the associated contact address of the type of communication. In some example embodiments, the priority list may be predetermined and stored in the memory 244. In some example embodiments, the priority list may be configured by the user or an administrator.

Referring again to event 808, having received the remote contact information from the messaging server 132, the mobile device 201 once again determines which of the accessed contacts have the part of the contact name and which have a contact address associated with the type of communication. At event 810, it is again determined whether no relevant contacts were found. If so, continuing the example, at event 812 the mobile device 201 contacts the next remote server, in this example the predetermined social media server(s) 500. At event 814, the mobile device 201 receives the search results from the social media server(s) 500. In an alternate example, each social media server 500 on the priority list is accessed one by one, through the loop of events 808, 810, 812, 814.

Referring again to event 810, if it is determined that relevant contacts have been identified which satisfy the part of the name and the type of communication, the method 800 proceeds to event 816, wherein the mobile device 201 outputs, to an output interface, a selectable list of all of the determined contacts. As described above in greater detail with respect to FIG. 6, the mobile device 201 may then, upon selection of one of the contacts on the list through an input interface, initiate a communication to the contact address of the selected contact using an application corresponding to the type of communication. Depending on the particular contact address, the communication may be initiated through the messaging server 132 or the social media server 500.

Referring again to event 812, if no relevant contacts can be found, at some point the priority list may have no more remote servers to search, indicated at event 818. The method 800 then proceeds to event 816 wherein the output to the interface may be, for example, a blank list having no entries, an error message, or a prompt for further input.

Figure 9:
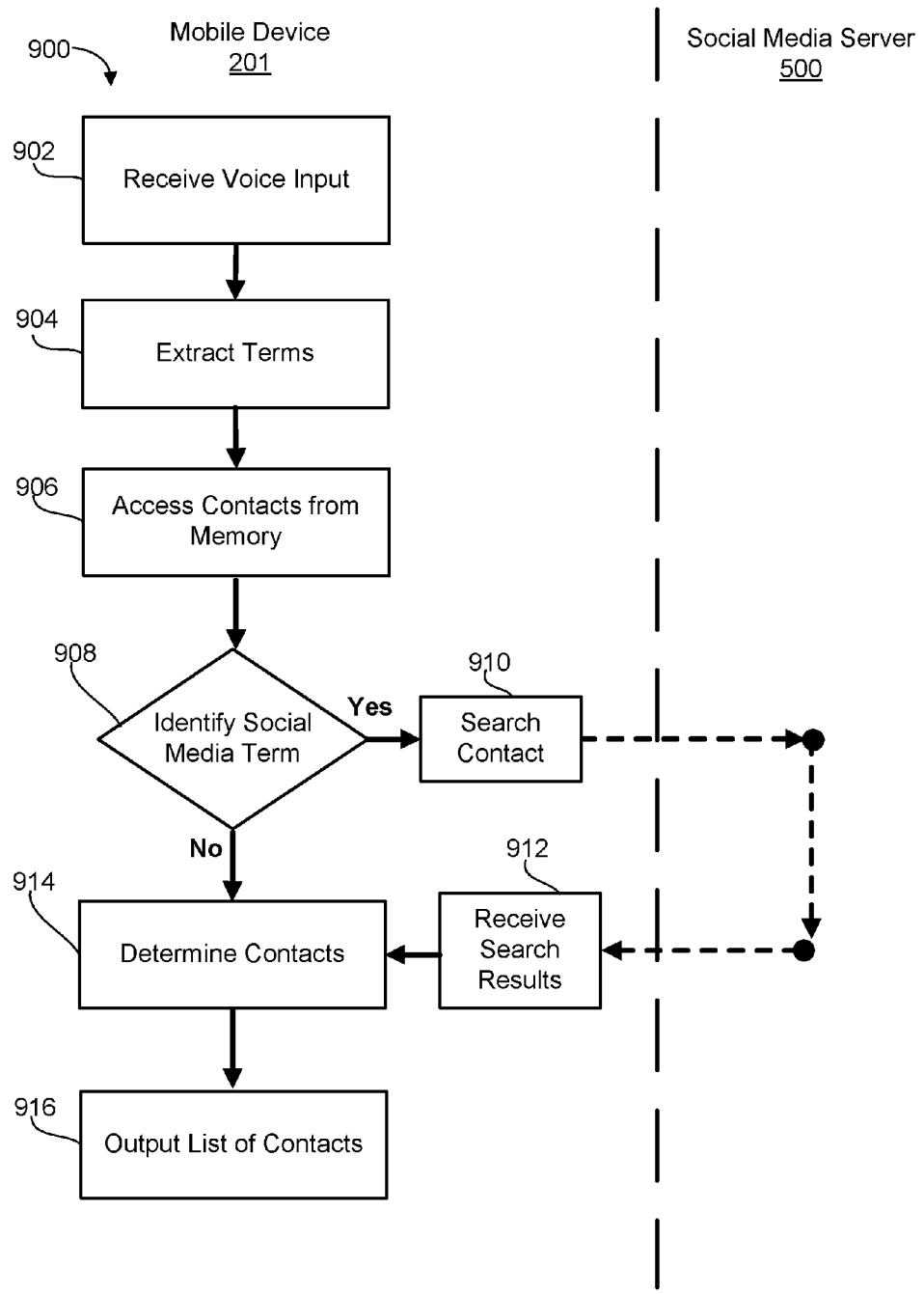
FIG. 9 shows another example method for identifying contacts for a communication, using a social media server, in accordance with another example embodiment.

Reference is now made to FIG. 9, which shows another example method 900 of identifying contacts for initiating a communication on the mobile device 201, in accordance with another example embodiment. Generally, in the example embodiment shown in FIG. 9, specific keywords particular to a social media server 500 may be identified for determining when to search the social media server 500. At event 902, the mobile device 201 receives through the audio input interface a voice input for initiating a communication. At event 904, the mobile device 201 extracts from the voice input a type of communication at least part of a contact name. At event 906, the mobile device 201 accesses the contact information from the address book 228 stored in memory 244.

At event 908, the mobile device 201 identifies from the extracted voice input a term which is specific to the social media server 500 or social media application. For example, this can be determined from a list of terms, which can be updated periodically or in real-time. For example, the term can be the specific name of the social media application, for example "Facebook", "LinkedIn", "MySpace", or "Twitter", etc. For example, the term can be a name of a specific type of message particular to the social media application, for example "wall" or "poke" for Facebook, "tweet" for Twitter, etc.

Only if such a social media related term is identified, then the method proceeds to event 910, wherein the mobile device 201 searches for any accessible contact information from the social media server 500 associated with that term, typically limited to the user's social network or friend's list. At event 912, the mobile device 201 receives the search results. The mobile device 201 may store or cache the received contact information. In other example embodiments, the mobile device 201 may store or cache the received contact name(s) along with only the associated contact address of the type of communication.

At event 914, the mobile device 201 determines which of the accessed contacts (locally, and remotely if searched) have the part of the contact name and which have a contact address associated with the type of communication. At event 916, the mobile device 201 outputs, to an output interface, a selectable list of all of the determined contacts. As described above in greater detail with respect to FIG. 6, the mobile device 201 may then, upon selection of one of the contacts on the list through an input interface, initiate a communication to the contact address of the selected contact using an application corresponding to the type of communication. Depending on the particular contact address, the communication may be initiated through the social media server 500 or through an application independent of the social media server 500.

For example, if the voice input of a user may say "Post on Logan's wall that I am attending". At event 906, the mobile device 201 accesses the contact information from the address book 228 stored in memory 244. At event 908, the mobile device 201 identifies from the extracted voice input a term which is specific to the social media server 500 or social media application, in this example "wall" which can be associated with the social media application, for example "Facebook".

At event 910, the mobile device 201 searches the user's social network or friend's list using the name "Logan" as a search term. At event 912, the mobile device 201 receives the search results. At event 914, the mobile device 201 determines which of the accessed contacts (locally and remotely) have the part of the contact name and which have a Facebook ID. At event 916, the mobile device 201 outputs, to an output interface, a selectable list of all of the contacts having the name "Logan" and which have a Facebook ID. The mobile device 201 may then receive selection of one of the contacts on the list through an input interface. Mobile device 201 then performs posting of the message "I am attending" to the wall of the selected contact through the social media server 500.

It may be appreciated that, in example embodiments, a user may be provided with a voice-free and, in some embodiments, an eyes-free interface. For example, example embodiments may be applied for use or installation within a vehicle, for use to a driver of a vehicle, or for use by a user who is visually impaired, etc. Some example embodiments may be used in a company, industrial, or factory setting, which may be installed as a fixed electronic device rather than a mobile device.

As well, it may be appreciated that some example methods do not require display onto the display screen 204. For example, in some example embodiment the device 201 is configured to disable the display screen 203, which conserves power to the mobile device 201.

It would be appreciated that, by reducing the number of listed contacts, less processing would be require for providing the list to the output interface, for example screen rendering or audio output. In some example embodiments, it would further be appreciated that complex disambiguation algorithms may not be required, as the user is given control to select which of the listed contacts was originally intended from the voice input.

While some example embodiments have been described as being primarily performed by the mobile device 201, it would be appreciated that some steps may be performed a server device (not shown); for example, for resource intensive off-site processing. In some example embodiments, for example referring to FIG. 6, the off-site server device may perform at least one or all of events 604, 606, 608, based on communication of data with the mobile device 201. The off-site server device may contain a library of aggregate information which can be better equipped to disambiguate received voice inputs. Typically, the off-site server is different than the remote servers which contain the remote contact information.

While some of the present embodiments are described in terms of methods, a person of ordinary skill in the art will understand that present embodiments are also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the example embodiments, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

The invention claimed is:

1. A method of initiating a communication using speech recognition on a mobile wireless communication device, comprising:

receiving through a microphone a voice input for initiating a communication;

parsing the voice input using speech recognition to identify and extract a name and a communication type to be initiated from a plurality of potential communication types including a telephone call, email, SMS message, MMS message, instant message, device-to-device message and a social media service message;

searching a local address book stored in a memory of the mobile wireless communication device to determine whether any contact records in the local address book match the extracted information, wherein the local address book is searched to identify all records having both a contact name including the name extracted from the voice input and a populated address field associated with the communication type extracted from the voice input;

when only one contact record in the local address book matches the extracted information, automatically initiating a communication to a contact address from the populated address field of the contact record using an application associated with the communication type;

when more than one contact record in the local address book matches the extracted information, outputting to an output interface of the mobile wireless communication device, a selectable list of all of the matching contacts, receiving selection of one of the contacts from the selectable list via an input interface of the mobile wireless communication device, and initiating a communication to a contact address from the populated address field of the contact record using an application associated with the communication type.

2. The method of claim 1, further comprising;
outputting to the output interface a notification that the mobile wireless communication device will automatically initiate a communication to a contact address from the populated address field of the contact record using an application associated with the communication type;
delaying the automatic initiation of the communication for a predetermined duration after outputting to the notification;
cancelling the automatic initiation of the communication when designated input to cancel the communication is received within the predetermined duration;
performing the automatic initiation of the communication when designated input to cancel the communication is not received within the predetermined duration.

3. The method of claim 1, wherein the output interface is a speaker that announces the selectable list of all of the matching contacts and the input interface is the microphone.

4. The method of claim 3, wherein the speaker and microphone are wirelessly connected to the mobile wireless communication device.

5. The method of claim 3, wherein the speaker and microphone are housed in the mobile wireless communication device.

6. The method of claim 1, wherein the output interface and the input interface are provided by a touchscreen display.

7. The method of claim 1, further comprising:
when no contact records in the local address book match the extracted information, accessing remote contact information of at least one remote server;
searching the remote contact information to determine whether any contact records in the local address book match the extracted information, wherein the remote contact information is searched to identify all records having both a contact name including the name extracted from the voice input and a populated address field associated with the communication type extracted from the voice input;
when only one contact record in the remote contact information matches the extracted information, automatically initiating a communication to a contact address from the populated address field of the contact record using an application associated with the communication type;
when more than one contact record in the remote contact information matches the extracted information, outputting to the output interface, a selectable list of all of the matching contacts, receiving selection of one of the contacts from the selectable list, and initiating a communication to a contact address from the populated address field of the contact record using an application associated with the communication type.

8. The method as claimed in claim 7, wherein the remote server includes a messaging server associated with an enterprise.

9. The method as claimed in claim 7, further comprising:
when no contact records in the remote contact information from the remote server match the extracted information, accessing remote contact information from a next remote server in a priority order.

10. The method of claim 7, wherein the remote server is associated with a social media service.

11. The method of claim 10, further comprising:
parsing the voice input using speech recognition to identify and extract a term specific to the social media service; and
sending a search request to the social media service using the application.

12. The method of claim 10, wherein the extracted communication type specifies a communication type specific to the social media service, the method further comprising initiating the communication to the contact address through the remote server using the social media service.

13. The method of claim 10, further comprising:
receiving selection of one of the listed contacts stored by the social media service; and
initiating the communication to the contact address using an application associated with the communication type, wherein the application is separate from the social media service.

14. The method of claim 10, wherein the remote contact information is limited to a contact list maintained within the social media service for a user associated with the mobile wireless communication device.

15. A mobile wireless communication device, comprising:
a processor;
a memory, a microphone, an input interface and an output interface coupled to the processor;
wherein the memory includes instructions, which when executed by the processor, cause the mobile wireless communication device to:
receive through an audio input interface a voice input for initiating a communication;
parse the voice input using speech recognition to identify and extract a name and a communication type to be initiated from a plurality of potential communication types including a telephone call, email, SMS message, MMS message, instant message, device-to-device message and social media service message;
searching a local address book stored in a memory of the mobile wireless communication device to determine whether any contact records in the local address book match the extracted information, wherein the local address book is searched to identify all records having both a contact name including the name extracted from the voice input and a populated address field associated with the communication type extracted from the voice input;
when only one contact record in the local address book matches the extracted information, automatically initiate a communication to a contact address from the populated address field of the contact record using an application associated with the communication type;
when more than one contact record in the local address book matches the extracted information, output to the output interface, a selectable list of all of the matching contacts, receive selection of one of the contacts from the selectable list via the input interface, and initiate a communication to a contact address from the populated address field of the contact record using an application associated with the communication type.

16. The mobile wireless communication device as claimed in claim 15, wherein the instructions, when executed by the processor, further cause the mobile wireless communication device to:
output to the output interface a notification that the mobile wireless communication device will automatically initiate a communication to a contact address from the populated address field of the contact record using an application associated with the communication type;
delay the automatic initiation of the communication for a predetermined duration after outputting to the notification;
cancel the automatic initiation of the communication when designated input to cancel the communication is received within the predetermined duration;
perform the automatic initiation of the communication when designated input to cancel the communication is not received within the predetermined duration.

17. The mobile wireless communication device of claim 15, wherein the output interface is a speaker that announces the selectable list of all of the matching contacts and the input interface is the microphone.

18. The mobile wireless communication device of claim 15, wherein the instructions, when executed by the processor, further cause the mobile wireless communication device to:
when no contact records in the local address book match the extracted information, access remote contact information of at least one remote server;
search the remote contact information to determine whether any contact records in the local address book match the extracted information, wherein the remote contact information is searched to identify all records having both a contact name including the name extracted from the voice input and a populated address field associated with the communication type extracted from the voice input;
when only one contact record in the remote contact information matches the extracted information, automatically initiate a communication to a contact address from the populated address field of the contact record using an application associated with the communication type;
when more than one contact record in the remote contact information matches the extracted information, output to the output interface, a selectable list of all of the matching contacts, receive selection of one of the contacts from the selectable list, and initiate a communication to a contact address from the populated address field of the contact record using an application associated with the communication type.

19. The mobile wireless communication device of claim 15, wherein the instructions, when executed by the processor, further cause the mobile wireless communication device to:
when no contact records in the remote contact information from the remote server match the extracted information, access remote contact information from a next remote server in a priority order.

20. A non-transitory machine readable medium having tangibly stored thereon executable instructions for execution by a processor of a mobile wireless communication device, wherein the executable instructions, when executed by the processor of the mobile wireless communication device, cause the mobile wireless communication device to:
receive through an audio input interface a voice input for initiating a communication;
parse the voice input using speech recognition to identify and extract a name and a communication type to be initiated from a plurality of potential communication types including a telephone call, email, SMS message, MMS message, instant message, device-to-device message and social media service message;
search a local address book stored in a memory of the mobile wireless communication device to determine whether any contact records in the local address book match the extracted information, wherein the local address book is searched to identify all records having both a contact name including the name extracted from the voice input and a populated address field associated with the communication type extracted from the voice input;
when only one contact record in the local address book matches the extracted information, automatically initiate a communication to a contact address from the populated address field of the contact record using an application associated with the communication type;
when more than one contact record in the local address book matches the extracted information, output to an output interface of the mobile wireless communication device, a selectable list of all of the matching contacts, receive selection of one of the contacts from the selectable list via an input interface of the mobile wireless communication device, and initiate a communication to a contact address from the populated address field of the contact record using an application associated with the communication type.

* * * * *